(12) United States Patent
Vangal

(10) Patent No.: US 6,791,376 B2
(45) Date of Patent: Sep. 14, 2004

(54) INTEGRATED CIRCUIT INTERCONNECT ROUTING USING DOUBLE PUMPED CIRCUITRY

(75) Inventor: Sriram R. Vangal, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/309,558

(22) Filed: Dec. 4, 2002

(65) Prior Publication Data

US 2003/0076150 A1 Apr. 24, 2003

Related U.S. Application Data

(62) Division of application No. 09/112,466, filed on Jul. 9, 1998, now Pat. No. 6,535,045.

(51) Int. Cl.[7] .............................................. H03K 17/00
(52) U.S. Cl. ......................................... 327/99; 327/355
(58) Field of Search ................... 327/99, 355, 407–411, 327/333

(56) References Cited

U.S. PATENT DOCUMENTS

| 4,430,745 | A | | 2/1984 | Betts ........................... 375/25 |
|---|---|---|---|---|
| 4,811,364 | A | * | 3/1989 | Sager et al. ................. 375/354 |
| 4,816,773 | A | * | 3/1989 | Pricer .......................... 330/267 |
| 5,122,757 | A | * | 6/1992 | Weber et al. ................ 327/105 |
| 5,159,278 | A | * | 10/1992 | Mattison ...................... 327/141 |
| 5,250,858 | A | | 10/1993 | Strong ......................... 307/465 |
| 5,506,874 | A | | 4/1996 | Izzard et al. ................. 375/340 |
| 5,844,844 | A | | 12/1998 | Bauer et al. ........... 365/189.05 |
| 5,987,083 | A | | 11/1999 | Matsushita et al. ......... 375/356 |
| 6,075,416 | A | | 6/2000 | Dalmia ......................... 331/25 |
| 6,225,831 | B1 | * | 5/2001 | Dalmia et al. ................. 327/12 |
| 6,300,809 | B1 | * | 10/2001 | Gregor et al. .............. 327/200 |
| 6,380,775 | B1 | * | 4/2002 | Reynolds ..................... 327/153 |
| 6,535,045 | B1 | * | 3/2003 | Vangal ......................... 327/333 |

* cited by examiner

Primary Examiner—Kenneth B. Wells
(74) Attorney, Agent, or Firm—Schwegman, Lundberg, Woessner & Kluth, P.A.

(57) ABSTRACT

Circuit interconnect communication circuitry dual edge triggered latching circuits transmit two data signals over a common interconnect line during one clock cycle; on signal is transmitted during each phase of a system clock over the common interconnect line. The latching circuits may be flip-flop circuits. A repeater circuit may have dual edge triggered flip-flop circuits for repeating the common interconnect line signal on a second common interconnect line. A receiver, including dual edge triggered latching circuitry, decodes the combined incoming data signals into separate outgoing data signals.

17 Claims, 3 Drawing Sheets

US 6,791,376 B2

INTEGRATED CIRCUIT INTERCONNECT ROUTING USING DOUBLE PUMPED CIRCUITRY

This application is a divisional of U.S. application Ser. No. 09/112,466 filed on Jul. 9, 1998; which is now U.S. Pat. No. 6,535,045.

TECHNICAL FIELD

Embodiments of the invention relate generally to data transmission and reception, and in particular to signal communication via integrated circuit interconnections.

BACKGROUND

Integrated circuit devices are fabricated with numerous internal circuits which require internal communication throughout the device. These circuits are coupled using interconnect lines, such as a patterned metal layer. Traditionally, integrated circuit interconnect lines required a relatively small percentage of an integrated circuit die area. Integrated circuits, however, are becoming more densely populated as the area required to fabricate transistors is reduced. Thus, as circuit density increases, the proportionate area required for the interconnect lines increases relative to the area required for circuitry. In addition, as the complexity of the integrated circuit continues to increase, the need for additional interconnect lines also increases.

One type of integrated circuit which has complex interconnect lines are switching, or routing devices. These integrated circuit routing devices operate as sophisticated multiplex circuitry to route numerous input connections to numerous output connections. These routing devices, often used in communication systems, require complex internal interconnect routing which could benefit from a reduction in the number of interconnect lines.

To increase data communication bandwidth between integrated circuits using a limited number of external connections, double pumped circuitry has been used in combination with clock multiplier circuits. The double pumped circuitry allows data to be transmitted between the integrated circuit devices at increased speeds compared to a system clock. For example, a clock multiplier which doubles the system clock can be provided to increase data between integrated circuits by a factor of two. This technique has been limited to external communications between integrated circuits to reduce the number of external package connections, and is not an attractive option for internal communication because of the need for clock multiplier circuits. For the reasons stated above, there is a need in the art for circuitry that relieves routing congestion within integrated circuits without requiring clock multiplier circuits.

SUMMARY

In one embodiment, integrated circuit interconnect circuitry is described which comprises a transmitter circuit and a receiver circuit. The transmitter includes a first flip-flop circuit adapted to receive a first input signal, a second flip-flop circuit adapted to receive a second input signal, and logic circuitry. The logic circuitry is coupled to the first and second flip-flop circuits to transmit an interconnect signal comprising the first and second input signals on an interconnect line. The receiver circuit is coupled to the interconnect line and comprises a third flip-flop circuit adapted to receive the interconnect signal and provide a first output signal corresponding to the first input signal, and a fourth flip-flop circuit adapted to receive the interconnect signal and provide a second output signal corresponding to the second input signal.

In another embodiment, an integrated circuit comprises a first internal circuit in electrical communication with a second internal circuit via interconnect circuitry. The interconnect circuitry includes a transmitter circuit which receives multiple input signals and provides a single output signal on a first interconnect line in response to a clock signal. The single output signal comprising portions of the multiple input signals. A repeater circuit is provided which receives the single output signal on the first interconnect line and re-transmits the single output signal on a second interconnect line. A receiver circuit is also provided which receives the single output signal on the second interconnect line and separates the single output signal into the multiple input signals in response to the clock signal.

In yet another embodiment, a method of reducing integrated circuit interconnect routing is described. The method comprises latching a first internal data signal in response to a rising edge of a system clock, latching a second internal data signal in response to a falling edge of the system clock, and transmitting the first internal data signal and the second internal data signal on an interconnect line as a composite signal. The first internal data signal is transmitted on the interconnect line when the system clock is in a high state, and the second internal data signal is transmitted on the interconnect line when the system clock is in a low state. The method also comprises receiving the composite signal transmitted on the interconnect line, and separating the composite signal into first and second internal output data signals.

An integrated circuit interconnect transmitter/repeater circuit is described which comprises a rising edge triggered latching circuit having an input connection and an output connection. A signal provided on the input connection is coupled to the output connection in response to a rising edge of a clock signal. A falling edge triggered latching circuit is provided which has an input connection and an output connection, such that a signal provided on the input connection is coupled to the output connection in response to a falling edge of the clock signal. A logic circuit is coupled to the output connections of the rising edge triggered latching circuit and the falling edge triggered latching circuit. The logic circuit provides a composite output signal comprising an output signal from the rising edge triggered latching circuit during one-half of the clock signal cycle, and an output signal from be falling edge triggered latching circuit during a second half of the clock signal cycle.

DETAILED DESCRIPTION

In the following detailed description of various embodiments of the invention, reference is made to the accompanying drawings which form a part hereof, and in which are shown by way of illustration specific embodiments of the invention. These embodiments are described in sufficient detail to enable those skilled in the art to practice what is disclosed herein, and it is to be understood that other embodiments may be utilized and that logical, mechanical and electrical changes may be made without departing from the scope of various embodiments of the invention. The following detailed description is, therefore, not to be taken in a limiting sense, and the scope various embodiments of the invention is defined only by the appended claims.

In some embodiments, circuitry is provided which relieves routing congestion in integrated circuits. In particular, one embodiment provides circuitry which transmits signals over internal integrated circuit interconnect lines in response to both edge transitions of a clock signal. The circuitry includes a transmitter circuit, a receiver circuit, and an optional repeater circuit. The circuitry does not use a clock multiplier circuit to increase a system clock frequency, but transmits data using both edges of the clock signal.

Figure 1:
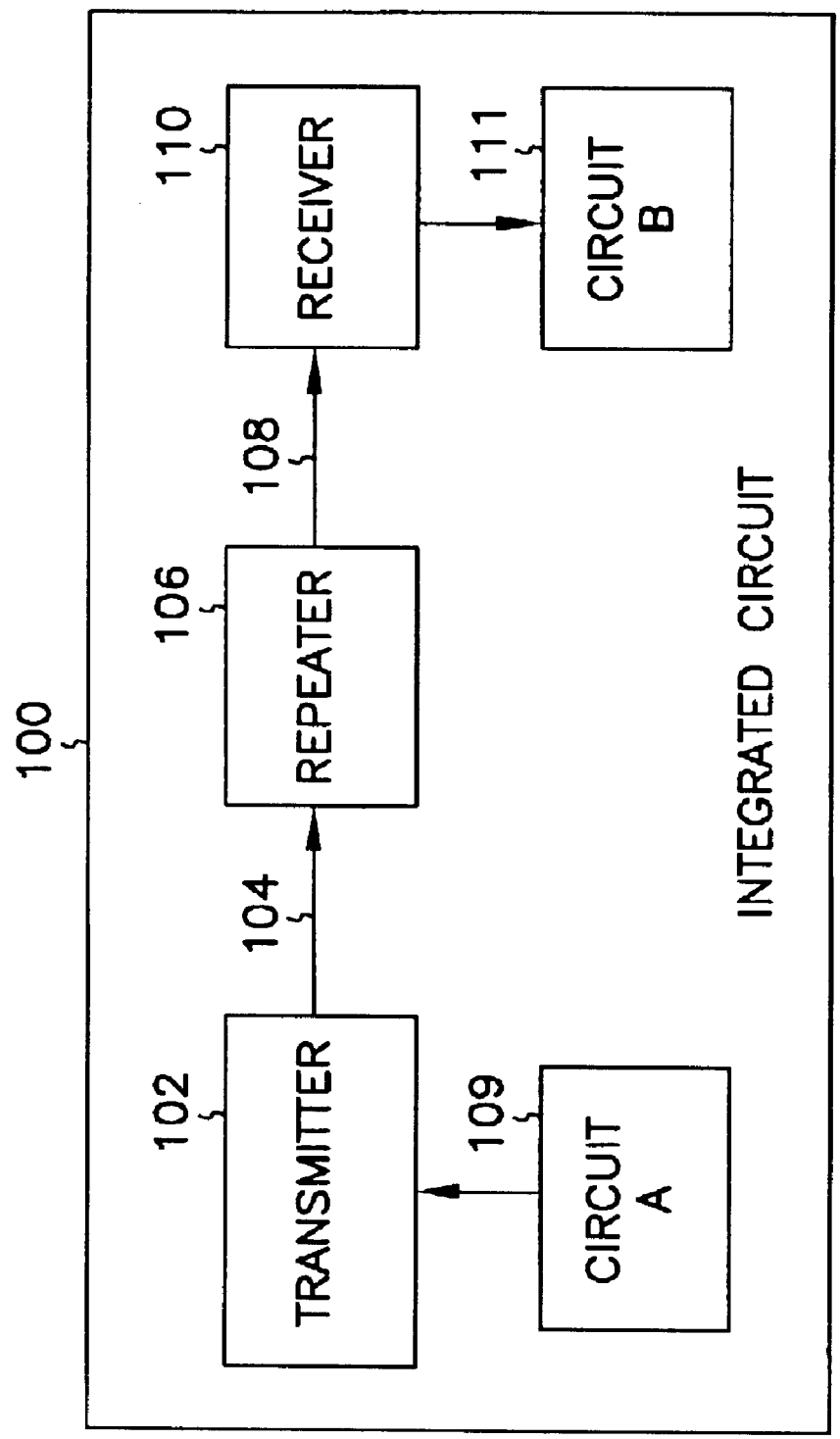
FIG. 1 is a block diagram of one embodiment of the present invention.

Referring to FIG. 1, one embodiment of an integrated circuit is described which incorporates circuitry for increasing communication efficiency. The integrated circuit can be any type of integrated circuit, including but not limited to a microprocessor, memory, communication router, or an application specific integrated circuit. The integrated circuit has numerous internal circuits remotely located from each other which need to communicate data with each other. To either increase the speed of data communication, or decrease the number of interconnect lines between the remote circuits, a double pumping transmitter and receiver are provided. For example, to communicate data from Circuit A 109 to Circuit B 111, a double pumping transmitter circuit 102 provides data to receiver circuit 110 at a rate which is twice the speed of a system clock. An optional repeater circuit 106 can be provided when the distance between Circuit A 109 and Circuit B 111 is longer than the optimum transmission capabilities of transmitter 102. The embodiment of FIG. 1 can reduce the interconnects between internal circuits by transmitting twice as much data over interconnect lines 104 and 108. That is, if the internal circuits require N interconnects, the double pumping transmitter and receiver circuits reduce the number of needed interconnects to N/2. Alternatively, the density of data transmitted over a single interconnect line can be doubled.

Figure 2:
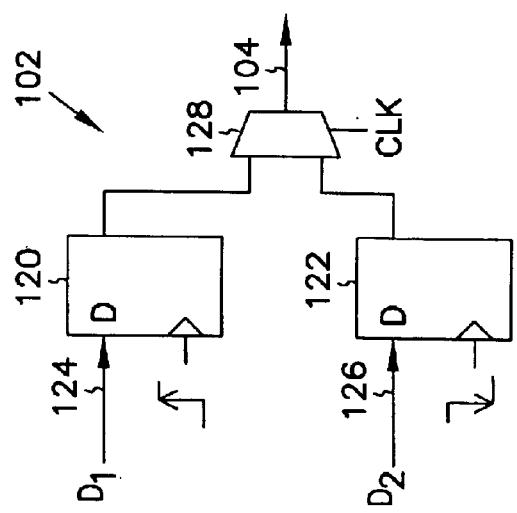
FIG. 2 is a block diagram of a transmitter circuit.

FIG. 2 illustrates one embodiment of transmitter 102. The transmitter includes two edge triggered flip-flop circuits 120 and 122 which are coupled to input connections 124 and 126, respectively. The input connections are intended to receive first and second data signals D1 and D2 which are desired to be communicated via interconnect line 104. Flip-flop circuit 120 is triggered on the rising edge of the system clock, such that a signal on input connection 124 is coupled to logic driver circuit 128. Conversely, flip-flop circuit 122 is triggered on the falling edge of the system clock to couple a signal on input connection 126 to logic driver circuit 128. The logic driver circuit is adapted to couple either an output signal from flip-flop 120, or an output signal from flip-flop 122 to interconnect line 104 during one-half of the system clock cycle. During operation, therefore, the transmitter 102 provides data on interconnect line 104 which comprises alternating data provided on inputs 124 and 126.

Figure 3:
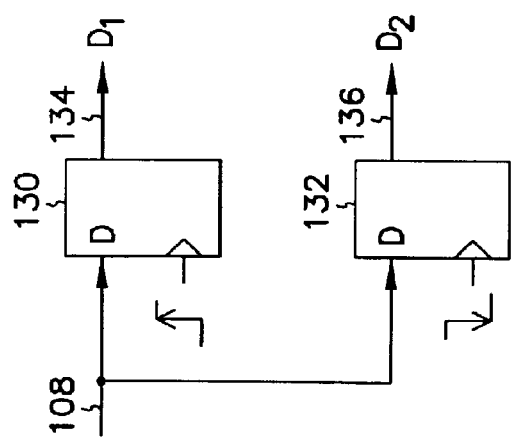
FIG. 3 is a block diagram of a receiver circuit.

FIG. 3 illustrates one embodiment of receiver 110. The receiver includes two edge triggered flip-flop circuits 130 and 132 which are coupled to receive data from interconnect line 108. Interconnect line 108 can be a common interconnect line with interconnect line 104. That is, if a repeater circuit is not required, the output connection of transmitter 102 can be coupled to an input connection of receiver 110 via a single continuous interconnect line. If a repeater circuit is required, the output connections of transmitter 102 will be discontinuous with interconnect line 108.

Flip-flop circuit 130 is adapted to couple data provided on interconnect line 108 to output connection 134 in response to a rising edge of the system clock signal. Similarly, flip-flop circuit 132 is adapted to couple data provided on interconnect line 108 to output connection 136 in response to a falling edge of the system clock signal.

Figure 4:
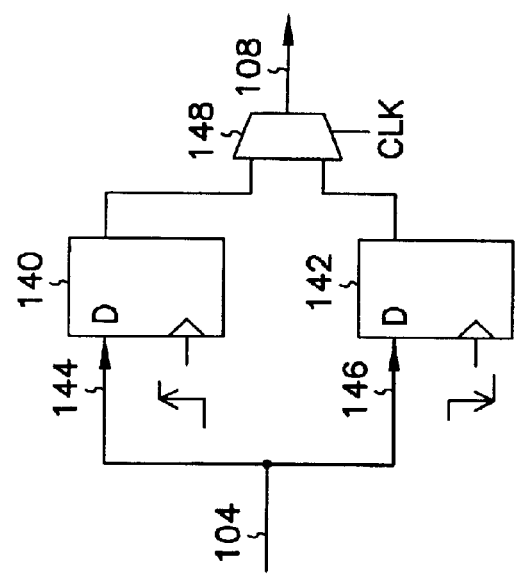
FIG. 4 is a block diagram of a repeater circuit.

Referring to FIG. 4, one embodiment of a repeater circuit 106 is described for coupling data signals provided on interconnect line 104 to interconnect line 108. The repeater circuit is used to preserve the integrity of data provided on interconnect line 104, and to support long interconnect routes. The repeater circuit has a latency of one-half of the system clock signal. In this embodiment, the repeater circuit is identical to transmitter circuit 102 of FIG. 2, but has the input connections of both flip-flop circuits connected. That is, the repeater circuit includes two flip-flop circuits 140 and 142 which are respectively triggered on a rising edge and a falling edge of the system clock signal. The input connections of the two flip-flop circuits are connected together, while the output connections of the flip-flop circuits are coupled to logic driver circuit 148. The logic driver circuit 148 provides an output signal on interconnect line 108 which repeats the data signal provided on interconnect line 104. Thus, the flip-flop circuits separate the composite interconnect signal into two component signals and provide the component signals to logic circuit 148.

Figure 5:
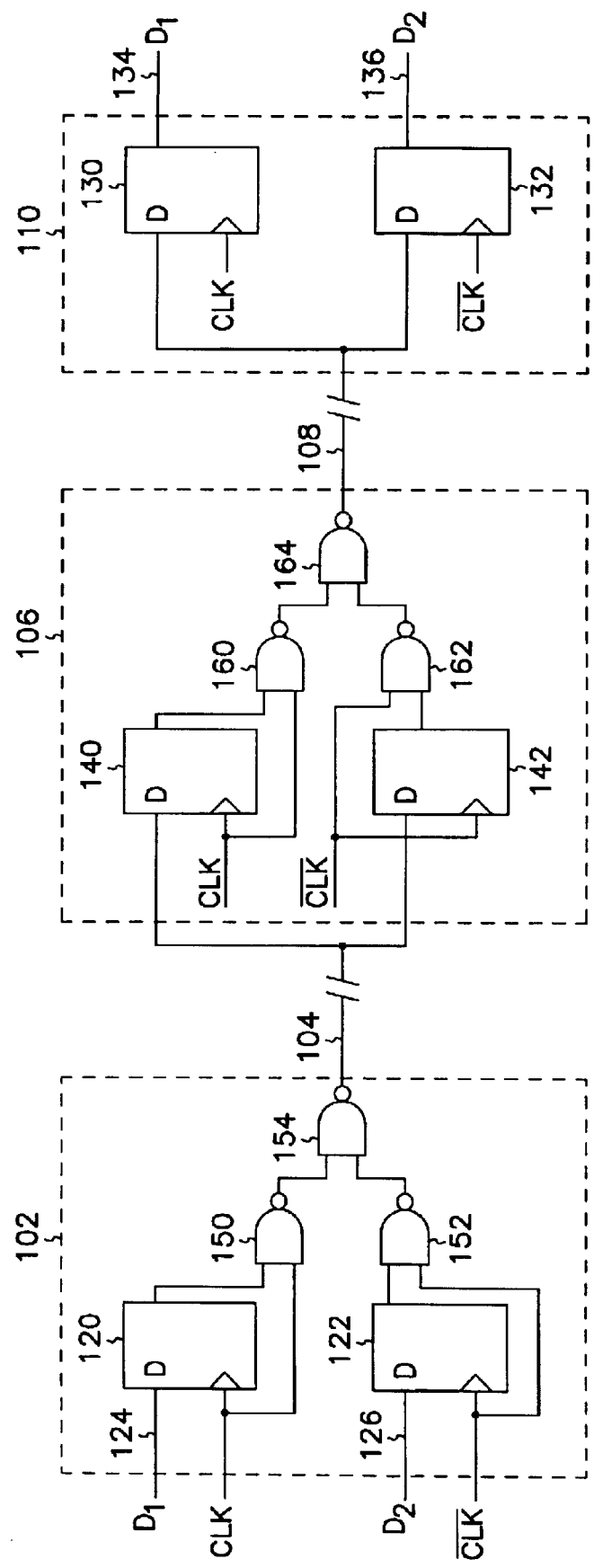
FIG. 5 is a schematic diagram of transmitter, receiver, and repeater circuits.

FIG. 5 illustrates one embodiment of an integrated circuit interconnect system having a transmitter, a repeater, and a receiver circuit. In this embodiment, the transmitter includes a first flip-flop circuit 120 having an output connection coupled to an input connection of NAND gate 150. The flip-flop circuit 120 is triggered on a rising edge of the clock signal (CLK). The clock signal is also coupled to a second input of the NAND gate 150. The flip-flop circuit, therefore, couples a signal provided on input connection 124 in response to a rising edge of the clock signal. NAND gate 150 provides an output while the clock signal is high which is equal to the inverse of the output signal of flip-flop circuit 120.

The transmitter also includes a second flip-flop circuit 122 having an output connection coupled to an input connection of NAND gate 152. The flip-flop circuit 122 is triggered on a falling edge of the clock signal, or as illustrated, on the rising edge of an inverse clock signal (/CLK). NAND gate 152 has an input connected to receive the inverse clocks signal and provide an output while the clock signal is low which is equal to the inverse of the output signal of flip-flop circuit 122. NAND gates 150 and 152 are coupled to NAND gate 154 which is provided to invert the output signals of gates 150 and 152 and provide the inverted signals on interconnect line 104.

A repeater circuit 106 is provided along interconnect line 104 to preserve data provided along interconnect line 104, and re-transmit the signal from line 104 along interconnect line 108. The repeater circuit is designed to include the same circuitry as transmitter circuit 102. As appreciated by those skilled in the art, a common design between the transmitter and repeater circuits allows for simplified integrated circuit designs. That is, the transmitter and receiver circuits are designed to be modular. The repeater circuit, therefore, includes first and second flip-flop circuits 140 and 142, and NAND gates 160, 162, and 164. The output of NAND gate 164 is provided on interconnect line 108. The receiver circuit 110 is coupled to receive data from interconnect line 108 and separate the data into first and second outputs signals. The receiver circuit in this embodiment is similar to that described with reference to FIG. 3, however flip-flop circuit 132 is adapted to be triggered on the rising edge of the inverse clock signal. It is noted that, data D1 is processed by flip-flop circuits 120, 142 and 130. Thus, if an even number of repeater circuits 106 are used, data D1 will be output on node 136.

The above described embodiments of the transmitter, repeater, and receiver circuits may provide more efficient communication between internal circuits of an integrated circuit. The transmitter, repeater, and receiver circuits can be provided individually or in combination to reduce the number of interconnect lines required throughout a single integrated circuit, or can be used to increase the density of data provided over an interconnect line. In present high frequency integrated circuits, one clock cycle is often allocated exclusively for routing delays. That is, a one clock cycle delay is anticipated for transmitting data across the integrated circuit chip. In a typical application of an embodiment of the present invention which uses a transmitter, one repeater and a receiver circuit, the overall data latency to transmit data across the interconnect is one clock cycle. A significant savings, therefore, is experienced in interconnect routing area with no increase in transmission latency. It will also be appreciated that the flip-flop circuits described herein can be replaced with any latching circuitry which can be triggered on a edge of a clock, or latch control signal, to couple an input connection signal to an output connection.

Internal integrated circuit interconnect communication circuitry has been described. This circuitry uses dual edge triggered flip-flop circuits to transmitter two data signals over a common interconnect line during one clock cycle. That is, one data bit is transmitted during each phase of a system clock over a common interconnect line. The circuitry can also include a repeater circuit which has dual edge triggered flip-flop circuitry for repeating the common interconnect line signal on a second interconnect line. A dual edge triggered flip-flop receiver circuit splits, or decodes, the two combined data signals into separate data signals.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of embodiments of the invention. Therefore, it is manifestly intended that embodiments of this invention be limited only by the claims and equivalents thereof. It is emphasized that the Abstract is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. It should also be noted that in the foregoing Detailed Description, various features may be grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. An apparatus, comprising:
   a transmitter circuit including a first flip-flop circuit to receive a first input signal, a second flip-flop circuit to receive a second input signal, and first logic circuitry coupled to the first and the second flip-flop circuits to transmit an interconnect signal on an interconnect line, the interconnect signal comprising the first input signal while a clock signal is in a first state and the second input signal while the clock signal is in a second state; and
   a repeater circuit coupled to the interconnect line, the repeater circuit including a third flip-flop circuit to receive the interconnect signal, a fourth flip-flop circuit to receive the interconnect signal, and second logic circuitry coupled to the third and the fourth flip-flop circuits to re-transmit the interconnect signal.

2. The apparatus of claim 1, wherein the first flip-flop circuit latches the first input signal in response to a rising edge of the clock signal, and the third flip-flop circuit latches the interconnect signal in response to the rising edge of the clock signal.

3. The apparatus of claim 1, wherein the second flip-flop circuit latches the second input signal in response to a falling edge of the clock signal, and the fourth flip-flap circuit latches the interconnect signal in response to the falling edge of the clock signal.

4. The apparatus of claim 1, wherein the first logic circuitry comprises series coupled NAND gates.

5. The apparatus of claim 1, wherein the second logic circuitry comprises series coupled NAND gates.

6. The apparatus of claim 1, wherein the repeater circuit includes the same circuitry as the transmitter circuit.

7. The apparatus of claim 1, further comprising:
   an odd number of additional repeater circuits coupled to the interconnect line.

8. A circuit comprising:
   a first internal circuit coupled to interconnect circuitry including a transmitter circuit capable of receiving multiple input signals and providing a single output signal on a first interconnect line in response to a clock signal, the single output signal comprising a first one of the multiple input signals while the clock signal is in a first state and a second one of the multiple input signals while the clock signal is in a second state, and a repeater circuit capable of receiving the single output signal on the first interconnect line and re-transmitting the single output signal on a second interconnect line; and
   a second internal circuit coupled to the second interconnect line, wherein the transmitter circuit
   comprises first and second flip-flop circuits coupled to receive the first and the second ones of the multiple input signals, respectively, in response to opposite edge transitions of the clock signal
   and logic circuitry coupled to output connections of the first and a second flip-flop circuits, the logic circuitry to single output signal, wherein the single output signal comprises the first one of the multiple input signals while the clock signal is in a high state, and wherein the single output signal comprises the second one of the multiple input signals while the clock signal is in a low state.

9. The circuit of claim 7 wherein the first flip-flop circuit receives the first one of the multiple input signals in response to a rising edge transition of the clock signal, and the second flip-flop circuit receives the second one of the multiple input signals in response to a falling edge transition of the clock signal.

10. The circuit of claim 8 wherein the logic circuitry comprises:
   a first NAND circuit having first and second input connections, the first input connection coupled to receive the clock signal, and the second input connection coupled to receive an output signal from the first flip-flop circuit;
   a second NAND circuit having first and second input connections, the first input connection coupled to receive an inverse clock signal, and the second input connection coupled to receive an output signal from the second flip-flop circuit; and
   a third NAND circuit having first and second input connections, the first input connection coupled to an output connection of the first NAND circuit, and the second input connection coupled to an output connection of the second NAND circuit.

11. A circuit comprising:
   a first internal circuit coupled to interconnect circuitry including a transmitter circuit capable of receiving multiple input signals and providing a single output signal on a first interconnect line in response to a clock signal, the single output signal comprising a first one of the multiple input signals while the clock signal is in a first state and a second one of the multiple input signals while the clock signal is in a second state, and a repeater circuit capable of receiving the single output signal on the first interconnect line and re-transmitting the single output signal on a second interconnect line; and
   a second internal circuit coupled to the second interconnect line, wherein the repeater circuit
   comprises first and second flip-flop circuits coupled to receive the single output signal in response to opposite edge transitions of the clock signal and to separate the single output signal into first and second component signals, respectively
   and logic circuitry coupled to output connections of the first and a second flip-flop circuits, the logic circuitry to re-transmit the single output signal, wherein the re-transmitted single output signal comprises the first component signal while the clock signal is in a high state, and comprises the second component signal while the clock signal is in a low state.

12. The circuit of claim 11 wherein the first flip-flop circuit receives the single output signal in response to a rising edge transition of the clock signal, and the second flip-flop circuit receives the single output signal in response to a falling edge transition of the clock signal.

13. The circuit of claim 11 wherein the logic circuitry comprises:
   a first NAND circuit having first and second input connections, the first input connection coupled to receive the clock signal, and the second input connection coupled to receive an output signal from the first flip-flop circuit;
   a second NAND circuit having first and second input connections, the first input connection coupled to receive an inverse clock signal, and the second input connection coupled to receive an output signal from the second flip-flop circuit; and
   a third NAND circuit having first and second input connections, the first input connection coupled to an output connection of the first NAND circuit, and the second input connection coupled to an output connection of the second NAND circuit.

14. A method of reducing circuit interconnect routing, the method comprising:
   latching a first data signal in response to a rising edge of a system clock;
   latching a second data signal in response to a falling edge of the system clock;
   transmitting the first data signal and the second data signal on an interconnect line as a composite signal, the first data signal being transmitted on the interconnect line when the system clock is in a high state, and the second data signal being transmitted on the interconnect line when the system clock is in a low state;
   receiving the composite signal at a repeater circuit;
   separating the composite signal into a first output data signal and a second output data signal at the repeater circuit; and
   re-combining the separated first and second output data signals at the repeater circuit to form a second composite signal to be transmitted to another circuit.

15. The method of claim 14 wherein the first data signal is latched using a rising edge triggered flip-flop circuit.

16. The method of claim 14 wherein the second data signal is latched using a falling edge triggered flip-flop circuit.

17. The method of claim 14 wherein the composite signal is separated into the first and the second output data signals using edge triggered flip-flop circuits.

* * * * *